United States Patent
Chen

(10) Patent No.: US 12,185,351 B2
(45) Date of Patent: Dec. 31, 2024

(54) MEASUREMENT METHOD, TERMINAL DEVICE, AND NETWORK DEVICE

(71) Applicant: VIVO MOBILE COMMUNICATION CO.,LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 380 days.

(21) Appl. No.: 17/668,655

(22) Filed: Feb. 10, 2022

(65) Prior Publication Data

US 2022/0167370 A1    May 26, 2022

Related U.S. Application Data

(63) Continuation of application No. PCT/CN2020/109231, filed on Aug. 14, 2020.

(30) Foreign Application Priority Data

Aug. 15, 2019   (CN) .......................... 201910755817.2

(51) Int. Cl.
*H04W 72/12* (2023.01)
*H04L 5/00* (2006.01)
(Continued)

(52) U.S. Cl.
CPC .......... *H04W 72/542* (2023.01); *H04L 5/0032* (2013.01); *H04W 76/27* (2018.02); *H04W 88/06* (2013.01)

(58) Field of Classification Search
CPC ..... H04W 72/12; H04W 72/54; H04W 72/04; H04W 72/08; H04W 24/02; H04W 24/08;
(Continued)

(56) References Cited

U.S. PATENT DOCUMENTS 10,681,599 B2 *   6/2020   Da Silva ........... H04W 36/0085
10,827,374 B2 *  11/2020   Luo .................... H04W 72/1268
(Continued)

FOREIGN PATENT DOCUMENTS

CN        103283156 A     9/2013
CN        105309001 A     2/2016
(Continued)

OTHER PUBLICATIONS

3GPP TSG RAN WG1 Meeting #96bis R1-1904121 Apr. 12, 2019: UE Power Consumption Reduction in RRM Measurement.*
(Continued)

*Primary Examiner* — Man U Phan
(74) *Attorney, Agent, or Firm* — Price Heneveld LLP

(57) ABSTRACT

Embodiments of this disclosure provide a measurement method, a terminal device, and a network device. The measurement method includes: receiving a measurement adjustment related parameter configured by a network device; and adjusting a radio resource management RRM measurement mode based on the measurement adjustment related parameter. According to the embodiments of this disclosure, effective switching or adjustment between different RRM measurement modes can be implemented, and a ping-pong effect of measurement is avoided, while power consumption of the terminal device is reduced. This prevents the terminal device from frequently adjusting the configuration of RRM measurement, and ensures configuration flexibility of the network device.

17 Claims, 3 Drawing Sheets

(51) Int. Cl.
*H04W 72/542* (2023.01)
*H04W 76/27* (2018.01)
*H04W 88/06* (2009.01)

(58) Field of Classification Search
CPC ..... H04W 24/10; H04W 36/00; H04W 36/32; H04W 48/16; H04W 88/06; H04W 88/02; H04W 76/27; H04W 16/08; H04W 16/28; H04L 5/00
USPC .......................................................... 370/252
See application file for complete search history.

(56) References Cited

U.S. PATENT DOCUMENTS

| | | | | |
|---|---|---|---|---|
| 10,972,926 | B2* | 4/2021 | Zhang | H04B 7/0695 |
| 11,122,454 | B2* | 9/2021 | Kim | H04W 24/10 |
| 11,363,480 | B2* | 6/2022 | Yi | H04W 72/542 |
| 11,395,228 | B2* | 7/2022 | Thangarasa | H04W 76/28 |
| 11,483,895 | B2* | 10/2022 | Liu | H04W 4/70 |
| 11,582,661 | B2* | 2/2023 | Wang | H04W 36/0094 |
| 2013/0258896 | A1 | 10/2013 | Park et al. | |
| 2016/0013984 | A1 | 1/2016 | Sun et al. | |
| 2017/0019810 | A1 | 1/2017 | Wu et al. | |
| 2017/0070312 | A1 | 3/2017 | Yi et al. | |
| 2017/0374574 | A1 | 12/2017 | Lee et al. | |
| 2019/0223041 | A1 | 7/2019 | Luo et al. | |
| 2020/0137604 | A1 | 4/2020 | Chen et al. | |
| 2021/0321335 | A1* | 10/2021 | Xu | H04W 24/10 |
| 2022/0007293 | A1* | 1/2022 | Kaikkonen | H04W 24/02 |
| 2022/0014943 | A1* | 1/2022 | Zhang | H04W 52/0212 |
| 2022/0131596 | A1* | 4/2022 | Sharma | H04B 7/0888 |
| 2022/0353763 | A1* | 11/2022 | Li | H04W 36/322 |

FOREIGN PATENT DOCUMENTS

| | | |
|---|---|---|
| CN | 106165323 A | 11/2016 |
| CN | 106941658 A | 7/2017 |
| CN | 109041098 A | 12/2018 |
| EP | 2176968 B1 | 2/2017 |
| WO | 2018028426 A1 | 2/2018 |

OTHER PUBLICATIONS

OPPO, "UE power Consumption Reduction in RRM Measurements", 3GPP TSG RAN WG1 #96, R1-1903351, Athens, Greece, Feb. 25-Mar. 1, 2019.

"3rd Generation Partnership Project; Technical Specification Group Radio Access Network; NR.' Study on User Equipment (UE) power saving in NR (Release 16)", 3GPP TR 38.840 V16.0.0 (Jun. 2019), Valbonne, France.

OPPO, "Measurement configuration enhancement to enable faster SN addition for EN-DC", 3GPP TSG-RAN2#99bis R2-1711479, Prague, Czech Republic, Oct. 9-13, 2017.

VIVO, "RRM measurement relaxation by reducing measured cell number", 3GPP TSG-RAN WG2 Meeting #106, R2-1905964, Reno, USA, May 13-17, 2019.

VIVO, "Time domain RRM measurement relaxation", 3GPP TSG-RAN WG2 Meeting #106, R2-1905963, Reno, USA, May 13-17, 2019.

* cited by examiner

MEASUREMENT METHOD, TERMINAL DEVICE, AND NETWORK DEVICE

CROSS-REFERENCE TO RELATED APPLICATIONS

The present application is a bypass continuation application of International Application No. PCT/CN2020/109231 filed on Aug. 14, 2020, which claims priority to Chinese Patent Application No. 201910755817.2, filed in China on Aug. 15, 2019, which are incorporated herein by reference in their entireties.

TECHNICAL FIELD

This disclosure relates to the field of communications technologies, and in particular, to a measurement method, a terminal device, and a network device.

BACKGROUND

With rapid development of user equipment (User Equipment, UE) technologies, there are more sensors on UE, and the UE is more intelligent. In many scenarios, the UE can accurately perceive whether the UE is in a moving state, and related moving information such as a speed in the moving state. In addition, the UE can also obtain the moving state of the UE or environment information or beam coverage information by using various sensors included in the UE, so that more control optimization can be performed on the UE based on the foregoing information, such as optimizing radio resource management (Radio Resource Management, RRM) measurement of the UE in an idle state and an inactive state, to achieve an objective of power saving.

Regardless of whether the UE is in a stationary state, a low-speed moving state, or a high-speed moving state, RRM measurement in the idle state generally complies with a unified condition to trigger measurement of a neighboring cell, and measurement of a current cell or the neighboring cell complies with a unified measurement requirement. In other words, there is no differentiated configuration for UE in different motion states, different environments, or different beam coverage. However, for UE in a stationary state or having a very low moving speed, if channel conditions do not change greatly, this is not conducive to power saving of the UE. For this type of UE, considering power saving of the UE, a relaxed RRM measurement mode is introduced to relax RRM measurement of the UE, for example, extend a measurement period and reduce a quantity of samples for layer 1 measurement. Whether to enter the relaxed RRM measurement mode from a normal RRM measurement mode may be determined based on a status of the UE or a threshold configured by a network device.

Therefore, a measurement solution is currently needed to enable the UE to effectively adjust the RRM measurement mode to avoid a ping-pong effect of measurement.

SUMMARY

An objective of embodiments of this disclosure is to provide a measurement method, a terminal device, and a network device, so that UE can effectively adjust an RRM measurement mode to avoid a ping-pong effect of measurement.

According to a first aspect, an embodiment of this disclosure provides a measurement method applied to a terminal device, where the method includes:

receiving a measurement adjustment related parameter configured by a network device; and adjusting a radio resource management RRM measurement mode based on the measurement adjustment related parameter.

According to a second aspect, an embodiment of this disclosure provides a terminal device, where the terminal device includes:

a receiving module, configured to receive a measurement adjustment related parameter configured by a network device; and a measurement module, configured to adjust a radio resource management RRM measurement mode based on the measurement adjustment related parameter.

According to a third aspect, an embodiment of this disclosure provides a terminal device, where the terminal device includes a memory, a processor, and a computer program stored in the memory and capable of running on the processor, where when the computer program is executed by the processor, the steps of the method according to the first aspect are implemented.

According to a fourth aspect, an embodiment of this disclosure provides a computer-readable storage medium, where the computer-readable storage medium stores a computer program, and when the computer program is executed by a processor, the steps of the method according to the first aspect are implemented.

According to a fifth aspect, an embodiment of this disclosure provides a measurement method applied to a network device, where the method includes:

sending a measurement adjustment related parameter to a terminal device, where the measurement adjustment related parameter is used to adjust a radio resource management RRM measurement mode of the terminal device.

According to a sixth aspect, an embodiment of this disclosure provides a network device, where the network device includes:

a sending module, configured to send a measurement adjustment related parameter to a terminal device, where the measurement adjustment related parameter is used to adjust a radio resource management RRM measurement mode of the terminal device.

According to a seventh aspect, an embodiment of this disclosure provides a network device, where the network device includes a memory, a processor, and a computer program stored in the memory and capable of running on the processor, where when the computer program is executed by the processor, the steps of the method according to the fifth aspect are implemented.

According to an eighth aspect, an embodiment of this disclosure provides a computer-readable storage medium, where the computer-readable storage medium stores a computer program, and when the computer program is executed by a processor, the steps of the method according to the fifth aspect are implemented.

BRIEF DESCRIPTION OF DRAWINGS

The accompanying drawings described herein are intended for better understanding of this disclosure, and constitute a part of this disclosure. Exemplary embodiments and descriptions thereof in this disclosure are intended to interpret this disclosure and do not constitute any improper limitation on this disclosure. In the accompanying drawings.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

The technical solutions of this disclosure may be applied to various communications systems, for example, a global system for mobile communications (Global System for Mobile communications, GSM), a code division multiple access (Code Division Multiple Access, CDMA) system, wideband code division multiple access (Wideband Code Division Multiple Access, WCDMA) system, a general packet radio service (General Packet Radio Service, GPRS) system, a long term evolution (Long Term Evolution, LTE) or long term evolution advanced (Long Term Evolution advanced, LTE-A) system, and an NR (New Radio) system.

A user end UE, which may also be referred to as a terminal device (Mobile Terminal), mobile user equipment, or the like, may communicate with one or more core networks through a radio access network (Radio Access Network, RAN). The user equipment may be a terminal device, such as a mobile phone (or referred to as a "cellular" phone) or a computer with a terminal device. For example, the user equipment may be a portable, pocket-sized, hand-held, computer built-in, or in-vehicle mobile apparatus, which exchanges voice and/or data with the radio access network.

A network device, which may also be referred to as a base station, may be a base transceiver station (Base Transceiver Station, BTS) in the GSM or CDMA system, or may be a NodeB (NodeB) in the WCDMA system, or may be an evolved NodeB (evolved NodeB, eNB or e-NodeB) in the LTE system or a 5G NodeB (gNB). This is not limited in the embodiments of this disclosure. For ease of description in the following embodiments, the gNB is used as an example for description.

The technical solutions provided in the embodiments of this disclosure are described in detail below with reference to the accompanying drawings.

Figure 1:
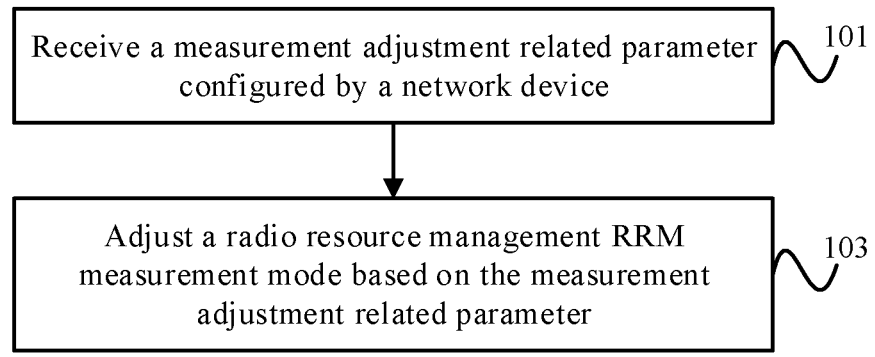
FIG. 1 is a schematic flowchart of a measurement method according to an embodiment of this disclosure.

FIG. 1 is a schematic flowchart of a measurement method according to an embodiment of this disclosure. The method may be performed by an electronic device, for example, a terminal device. In other words, the method may be performed by software or hardware installed on the terminal device. As shown in FIG. 1, the method may include the following steps.

Step 101: Receive a measurement adjustment related parameter configured by a network device.

Step 103: Adjust a radio resource management RRM measurement mode based on the measurement adjustment related parameter.

In this embodiment of this disclosure, the radio resource management RRM measurement mode is adjusted by using the measurement adjustment related parameter configured by the network device. Therefore, effective switching or adjustment between different RRM measurement modes can be implemented, and a ping-pong effect of measurement is avoided, while power consumption of the terminal device is reduced. This prevents the terminal device from frequently adjusting the configuration of RRM measurement, and ensures configuration flexibility of the network device.

Optionally, in the measurement method in this embodiment of this disclosure, the measurement adjustment related parameter includes one of the following:

(1) a parameter separately configured by the network device for the terminal device, that is, a per-UE configuration, that is, the network device may configure a separate measurement adjustment related parameter for each terminal device, so that the parameters better adapt to different types of terminal devices with different performance and configurations;

(2) a parameter configured by the network device for a current cell of the terminal device, that is, a per-cell configuration, that is, the network device may configure consistent parameters within a range of the cell, and the terminal device applies related parameters within the range of the current cell;

(3) a parameter configured by the network device within a range of each frequency, carrier, band, or bandwidth part, that is, a per-frequency, per-carrier, per-band, or per-BWP (Bandwidth Part) configuration, that is, the network device configures consistent parameters within the range of the frequency, the carrier, the band, or the BWP;

(4) a parameter configured by the network device within a range of each frequency, carrier, band, or bandwidth part for the terminal device, that is, a per-frequency, per-carrier, per-band, or per-BWP configuration per UE, that is, the network device may configure consistent parameters within the range of the frequency, the carrier, the band, or the BWP for each terminal device; and (5) a parameter configured by the network device for each beam corresponding to the terminal device, that is, a per-beam configuration, that is, the terminal device may apply the parameter when performing RRM measurement on a corresponding beam.

Optionally, in the measurement method in this embodiment of this disclosure, the foregoing step 101 may be specifically performed as follows:

in a case in which the terminal device is in an RRC connected state, receiving the measurement adjustment related parameter by using an RRC dedicated message or a broadcast message; or in a case in which the terminal device is in an RRC idle state or an RRC inactive state, receiving the measurement adjustment related parameter by using an RRC connection release message, an RRC connection suspension message, or a broadcast message.

Further optionally, in the measurement method in this embodiment of this disclosure, before the foregoing step 101, the method may further include the following content:

sending a measurement adjustment request to the network device, where the measurement adjustment request includes a request for obtaining the measurement adjustment related parameter.

It may be understood that the measurement adjustment related parameter for adjusting the RRM measurement mode is obtained by actively sending the measurement adjustment request to the network device, so that the measurement mode is adjusted based on a specific instruction of the network device.

Further optionally, the measurement adjustment request may further include a request for obtaining configuration information of the RRM measurement mode, so that RRM measurement is performed based on a related specific configuration.

Optionally, in the measurement method in this embodiment of this disclosure, the RRM measurement mode may include at least one of a relaxed RRM measurement mode, a normal RRM measurement mode, and an enhanced RRM measurement mode. In other words, the terminal device may perform switching or adjustment between the foregoing different RRM measurement modes based on the measurement adjustment related parameter.

The relaxed RRM measurement mode can reduce power consumption of the terminal device. The relaxed RRM measurement mode may include at least a relaxed RRM measurement mode in which the terminal device is in the radio resource control (Radio Resource Control, RRC) connected state, the RRC idle state, or the RRC inactive state. A related configuration parameter of the relaxed RRM measurement mode may include one of the following:

(1) A measurement period in the relaxed RRM measurement mode is longer than a measurement period in the normal RRM measurement mode.

Optionally, the relaxed RRM measurement mode includes a relaxed RRM measurement mode in time domain. Extension of a measurement period may include extension of an L1 measurement period or an L2 measurement period or an L3 measurement period.

(2) A quantity of samples in a measurement period in the relaxed RRM measurement mode is less than a quantity of samples in a measurement period in the normal RRM measurement mode.

Optionally, the relaxed RRM measurement mode includes a relaxed RRM measurement mode in time domain, and a quantity of samples in a measurement period includes a quantity of L1 samples or L2 samples or L3 samples.

(3) Within a fourth preset time, a measurement frequency in the relaxed RRM measurement mode is lower than a measurement frequency in the normal RRM measurement mode.

Optionally, the measurement frequency may be 0, that is, RRM measurement is not performed within the fourth preset time.

(4) A quantity of neighboring cells on which RRM measurement is performed in the relaxed RRM measurement mode is less than a quantity of neighboring cells on which RRM measurement is performed in the normal RRM measurement mode.

Optionally, the neighboring cells may include intra-frequency (intra-frequency) neighboring cells, inter-frequency (inter-frequency) neighboring cells, or inter-RAT (inter-RAT) neighboring cells.

(5) A quantity of target objects on which inter-frequency RRM measurement or inter-system measurement is performed in the relaxed RRM measurement mode is less than a quantity of target objects on which inter-frequency RRM measurement or inter-system measurement is performed in the normal RRM measurement mode, where the target object includes at least one of a carrier, a frequency, a band, and a bandwidth part.

(6) An additional reference signal (additional Reference Signal) is used to perform RRM measurement.

The enhanced RRM measurement mode includes an enhanced RRM measurement mode in which the terminal device is in the radio resource control RRC connected state, the RRC idle state, or the RRC inactive state. A related configuration parameter of the enhanced RRM measurement mode may include one of the following:

(1) A measurement period in the enhanced RRM measurement mode is shorter than a measurement period in the normal RRM measurement mode.

Optionally, the enhanced RRM measurement mode includes a relaxed RRM measurement mode in time domain. Shortening of a measurement period may include shortening of an L1 measurement period or an L2 measurement period or an L3 measurement period.

(2) A quantity of samples in a measurement period in the enhanced RRM measurement mode is greater than a quantity of samples in a measurement period in the normal RRM measurement mode.

Optionally, the enhanced RRM measurement mode includes a relaxed RRM measurement mode in time domain, and a quantity of samples in a measurement period includes a quantity of L1 samples or L2 samples or L3 samples.

(3) Within a fifth preset time, a measurement frequency in the enhanced RRM measurement mode is higher than a measurement frequency in the normal RRM measurement mode.

(4) A quantity of neighboring cells on which RRM measurement is performed in the enhanced RRM measurement mode is greater than a quantity of neighboring cells on which RRM measurement is performed in the normal RRM measurement mode.

Optionally, the neighboring cells may include intra-frequency intra-frequency neighboring cells, inter-frequency inter-frequency neighboring cells, or inter-RAT inter-system neighboring cells.

(5) A quantity of target objects on which inter-frequency RRM measurement or inter-system measurement is performed in the enhanced RRM measurement mode is greater than a quantity of target objects on which inter-frequency RRM measurement or inter-system measurement is performed in the normal RRM measurement mode, where the target object includes at least one of a carrier, a frequency, a band, and a bandwidth part.

(6) An additional reference signal (additional Reference Signal) is used to perform RRM measurement.

Optionally, in the measurement method in this embodiment of this disclosure, the foregoing step 103 may be specifically performed as follows:

adjusting an RRM measurement mode of at least one of a current cell and a neighboring cell of the terminal device based on the measurement adjustment related parameter.

It may be understood that adjusting the RRM measurement mode based on the measurement adjustment related parameter may relate to at least one of the RRM measurement mode of the current cell and the RRM measurement mode of the neighboring cell.

Specifically, when there is RRM measurement of the neighboring cell, the relaxed RRM measurement mode may include at least one of a relaxed RRM measurement mode of the current cell and a relaxed RRM measurement mode of the neighboring cell, and the enhanced RRM measurement mode may include at least one of an enhanced RRM measurement mode of the current cell and an enhanced RRM measurement mode of the neighboring cell; or when there is no RRM measurement of the neighboring cell, the relaxed RRM measurement mode includes a relaxed RRM measurement mode of the current cell, and the enhanced RRM measurement mode includes an enhanced RRM measurement mode of the current cell.

Optionally, in the measurement method in this embodiment of this disclosure, the measurement adjustment related parameters configured by the network device may include a plurality of types of parameters. This enables the terminal device to effectively adjust the RRM measurement mode based on different specific measurement adjustment related parameters, and can also ensure configuration flexibility of the network device.

The measurement adjustment related parameter may include at least one of a measurement adjustment threshold, a measurement adjustment duration parameter, preset cell coverage, and preset beam coverage.

Optionally, in a case of different measurement adjustment related parameters, the foregoing step 103 may be performed with different content. Details may be described with reference to the following embodiments.

Specific Embodiment 1

Optionally, in the specific Embodiment 1, the foregoing measurement adjustment related parameter includes the measurement adjustment threshold. In this case, the foregoing step 103 may be specifically performed as follows:

adjusting the RRM measurement mode based on the measurement adjustment threshold and an RRM measurement result, where the measurement adjustment threshold includes at least one of a first threshold and a second threshold.

It may be understood that, whether to adjust the RRM measurement mode may be specifically determined based on the measurement adjustment threshold configured by the network device, that is, switching or adjustment between RRM measurement modes is triggered by determining whether a condition based on the measurement adjustment threshold is met, and a ping-pong effect of measurement is avoided. This prevents the terminal device from frequently adjusting the configuration of RRM measurement.

Optionally, the RRM measurement result may include at least reference signal received power (Reference Signal Received Power, RSRP), reference signal received quality (Reference Signal Received Quality, RSRQ), a signal to interference plus noise ratio (Signal-to-Noise and Interference Ratio, SINR), and a channel quality indicator (Channel Quality Indicator, CQI).

Optionally, the RRM measurement result includes at least one of the following:

a first result obtained by performing RRM measurement on the current cell of the terminal device, where the first result includes at least one of a cell measurement result and a beam measurement result; and a second result obtained by performing RRM measurement on the neighboring cell of the terminal device, where the second result includes at least one of a cell measurement result and a beam measurement result.

It may be understood that the RRM measurement result includes at least one of an RRM measurement result of the current cell and an RRM measurement result of the neighboring cell. Further, the RRM measurement result may include a cell measurement result and a beam measurement result, and the beam measurement result may be obtained by performing RRM measurement based on a synchronization signal and physical broadcast channel signal block (Synchronization Signal and PBCH Block, SSB), a channel state information reference signal (Channel State Information RS, CSI-RS), a demodulation reference signal (Demodulation Reference Signal, DMRS), or other reference signals.

Optionally, for the RRM measurement result of the current cell and the RRM measurement result of the neighboring cell, different thresholds may be used for comparison separately, that is, the RRM measurement result of the current cell and the RRM measurement result of the neighboring cell are used for comparison with different thresholds separately; or only the RRM measurement result of the current cell or the RRM measurement result of the neighboring cell is used for comparison with a corresponding threshold.

The current cell includes a current serving cell of the terminal device, a cell on which the terminal device camps in the idle state, or a cell on which the terminal device camps in the inactive Inactive state. The neighboring cell includes an intra-frequency intra-frequency neighboring cell, an inter-frequency inter-frequency neighboring cell, or an inter-radio access system inter-RAT (Radio Access Technology) cell.

Optionally, the measurement adjustment thresholds, that is, the first threshold and the second threshold, may be the same or may be different. At least one of the first threshold and the second threshold may be the same as or different from a threshold of an S-measure (S measure) mechanism for controlling RRM measurement of the neighboring cell currently in the connected state or idle state or inactive state. Optionally, when the measurement adjustment threshold is used to control adjustment of the RRM measurement mode of the current cell, the first threshold may be higher than or equal to the threshold of the S-measure mechanism, or the first threshold may be lower than or equal to the threshold of the S-measure mechanism threshold. Further optionally, when the measurement adjustment threshold is used to control adjustment of the RRM measurement mode of the neighboring cell, both the first threshold and the second threshold are lower than or equal to the threshold of the S-measure mechanism.

Optionally, in a case in which the first threshold and the second threshold are different, the two thresholds may have different magnitude relationships based on different specific situations. Further optionally, the second threshold is lower than the first threshold.

Optionally, the solution to adjusting the RRM measurement mode based on the measurement adjustment threshold and the RRM measurement result may be specifically implemented as follows:

If the RRM measurement result is higher than or equal to the first threshold, a first RRM measurement mode is used to perform RRM measurement, where the first RRM measurement mode includes the relaxed RRM measurement mode or the normal RRM measurement mode.

It may be understood that, in a case in which the RRM measurement result is higher than or equal to the first threshold, the terminal device may use the relaxed RRM measurement mode to perform RRM measurement, or else, use the normal RRM measurement mode or the enhanced RRM measurement mode to perform RRM measurement; or in a case in which the RRM measurement result is higher than or equal to the first threshold, the terminal device may further use the normal RRM measurement mode to perform RRM measurement, or else, use the enhanced RRM measurement mode to perform RRM measurement.

Alternatively,
if the RRM measurement result is lower than or equal to the second threshold, a second RRM measurement mode is used to perform RRM measurement, where the second RRM measurement mode includes the normal RRM measurement mode or the enhanced RRM measurement mode.

It may be understood that, in a case in which the RRM measurement result is lower than or equal to the second threshold, the terminal device may use the normal RRM measurement mode to perform RRM measurement, or else, use the relaxed RRM measurement mode to perform RRM measurement; or in a case in which the RRM measurement result is lower than or equal to the second threshold, the terminal device may further use the enhanced RRM measurement mode to perform RRM measurement, or else, use the relaxed RRM measurement mode or the normal RRM measurement mode to perform RRM measurement.

Specific Embodiment 2

Optionally, in the specific Embodiment 2, the measurement adjustment related parameter may further include a first measurement adjustment duration parameter on a basis of the measurement adjustment threshold. In this case, the foregoing solution to adjusting the RRM measurement mode based on the measurement adjustment threshold and the RRM measurement result may be specifically performed as follows:

adjusting the RRM measurement mode based on the measurement adjustment threshold, the RRM measurement result, and the first measurement adjustment duration parameter, where the first measurement adjustment duration parameter includes a first preset time or a second preset time.

It may be understood that, whether to adjust the RRM measurement mode may be specifically determined based on the measurement adjustment threshold and the first measurement adjustment duration parameter that are configured by the network device, that is, switching or adjustment between RRM measurement modes is triggered by determining whether a condition based on the measurement adjustment threshold and the first measurement adjustment duration parameter is met, and a ping-pong effect of measurement is avoided. This prevents the terminal device from frequently adjusting the configuration of RRM measurement.

Further optionally, the foregoing solution to adjusting the RRM measurement mode based on the measurement adjustment threshold, the RRM measurement result, and the first measurement adjustment duration parameter may be specifically performed as follows:

If the RRM measurement result is higher than or equal to the first threshold within the entire first preset time, a first RRM measurement mode is used to perform RRM measurement, where the first RRM measurement mode includes the relaxed RRM measurement mode or the normal RRM measurement mode.

It may be understood that, in a case in which the RRM measurement result is higher than or equal to the first threshold within the entire first preset time, the terminal device may use the relaxed RRM measurement mode to perform RRM measurement, or else, use the normal RRM measurement mode or the enhanced RRM measurement mode to perform RRM measurement; or in a case in which the RRM measurement result is higher than or equal to the first threshold within the entire first preset time, the terminal device may further use the normal RRM measurement mode to perform RRM measurement, or else, use the enhanced RRM measurement mode to perform RRM measurement.

Alternatively,
if the RRM measurement result is lower than or equal to the second threshold within the entire second preset time, a second RRM measurement mode is used to perform RRM measurement, where the second RRM measurement mode includes the normal RRM measurement mode or the enhanced RRM measurement mode.

It may be understood that, in a case in which the RRM measurement result is lower than or equal to the second threshold within the entire second preset time, the terminal device may use the normal RRM measurement mode to perform RRM measurement, or else, use the relaxed RRM measurement mode to perform RRM measurement; or in a case in which the RRM measurement result is lower than or equal to the second threshold within the entire second preset time, the terminal device may further use the enhanced RRM measurement mode to perform RRM measurement, or else, use the relaxed RRM measurement mode or the normal RRM measurement mode to perform RRM measurement.

Specific Embodiment 3

Optionally, in the specific Embodiment 3, the measurement adjustment related parameter may further include a first measurement adjustment duration parameter on a basis of the measurement adjustment threshold. In this case, the foregoing solution to adjusting the RRM measurement mode based on the measurement adjustment threshold, the RRM measurement result, and the first measurement adjustment duration parameter may be specifically further performed as follows:

If the RRM measurement result is higher than or equal to the first threshold, and the RRM measurement result is higher than or equal to the second threshold within the entire first preset time, a first RRM measurement mode is used to perform RRM measurement, where the first RRM measurement mode includes the relaxed RRM measurement mode or the normal RRM measurement mode.

It may be understood that, in a case in which the RRM measurement result is higher than or equal to the first threshold, and the RRM measurement result is higher than or equal to the second threshold within the entire first preset time, the terminal device may use the relaxed RRM measurement mode to perform RRM measurement, or else, use the normal RRM measurement mode or the enhanced RRM measurement mode to perform RRM measurement; or in a case in which the RRM measurement result is higher than or equal to the first threshold, and the RRM measurement result is higher than or equal to the second threshold within the entire first preset time, the terminal device may further use the normal RRM measurement mode to perform RRM measurement, or else, use the enhanced RRM measurement mode to perform RRM measurement.

Alternatively,
if the RRM measurement result is lower than or equal to the second threshold, and the RRM measurement result is lower than or equal to the first threshold within the entire second preset time, a second RRM measurement mode is used to perform RRM measurement, where the second RRM measurement mode includes the normal RRM measurement mode or the enhanced RRM measurement mode.

It may be understood that, in a case in which the RRM measurement result is lower than or equal to the second threshold, and the RRM measurement result is lower than or equal to the first threshold within the entire second preset time, the terminal device may use the normal RRM measurement mode to perform RRM measurement, or else, use the relaxed RRM measurement mode to perform RRM measurement; or in a case in which the RRM measurement result is lower than or equal to the second threshold, and the RRM measurement result is lower than or equal to the first threshold within the entire second preset time, the terminal device may further use the enhanced RRM measurement mode to perform RRM measurement, or else, use the relaxed RRM measurement mode or the normal RRM measurement mode to perform RRM measurement.

Specific Embodiment 4

Optionally, in the specific Embodiment 4, the measurement adjustment related parameter includes a second measurement adjustment duration parameter, and the second measurement adjustment duration parameter includes a third preset time. In this case, the foregoing step 103 may be specifically performed as follows:

after starting to use a third RRM measurement mode to perform RRM measurement for the third preset time, switching to use a fourth RRM measurement mode to perform RRM measurement, where the third RRM measurement mode includes the relaxed RRM measurement mode or the enhanced RRM measurement mode, and the fourth RRM measurement mode includes the normal RRM measurement mode.

It may be understood that, whether to adjust the RRM measurement mode may be specifically determined based on the second measurement adjustment duration parameter configured by the network device, that is, switching or adjustment between RRM measurement modes is triggered by determining whether a condition based on the second measurement adjustment duration parameter is met. Specifically, after the terminal device uses the relaxed RRM measurement mode or the enhanced RRM measurement mode to perform RRM measurement for the third preset time, the terminal device may automatically switch back to use the normal RRM measurement mode, and avoid a ping-pong effect of measurement. This prevents the terminal device from frequently adjusting the configuration of RRM measurement.

Optionally, the third preset time includes at least one of the following:

(1) A set time of an RRM measurement timer.

It may be understood that, when the terminal device uses the relaxed RRM measurement mode or the enhanced RRM measurement mode to start to perform RRM measurement, the RRM measurement timer is started. In a case in which the RRM measurement timer expires, the terminal device automatically switches back to the normal RRM measurement mode.

(2) A time corresponding to a first preset quantity of RRM measurement periods.

It may be understood that, after the terminal device uses the relaxed RRM measurement mode or the enhanced RRM measurement mode to perform RRM measurement for the first preset quantity of RRM measurement periods, the terminal device automatically switches back to the normal RRM measurement mode. Specifically, an RRM measurement period counter may be used to count a total quantity of RRM measurement periods in which RRM measurement is performed by using the relaxed RRM measurement mode or the enhanced RRM measurement mode.

(3) A time required to perform RRM measurement on a second preset quantity of RRM measurement samples.

It may be understood that, after the terminal device uses the relaxed RRM measurement mode or the enhanced RRM measurement mode to perform RRM measurement on the second preset quantity of RRM measurement samples, the terminal device automatically switches back to the normal RRM measurement mode. Specifically, an RRM measurement sample counter may be used to count a total quantity of RRM measurement samples on which RRM measurement is performed by using the relaxed RRM measurement mode or the enhanced RRM measurement mode.

It should be noted that the third preset time may alternatively be a time parameter value directly configured by the network device in addition to the foregoing case.

Specific Embodiment 5

Optionally, in the specific Embodiment 5, the foregoing measurement adjustment related parameter includes preset cell coverage or preset beam coverage. In this case, the foregoing step 103 may be specifically performed as follows:

if the terminal device moves into the preset cell coverage or the preset beam coverage, using a fifth RRM measurement mode to perform RRM measurement, where the fifth RRM measurement mode includes the relaxed RRM measurement mode or the enhanced RRM measurement mode; or if the terminal device moves out of the preset cell coverage or the preset beam coverage, using a sixth RRM measurement mode to perform RRM measurement, where the sixth RRM measurement mode includes the normal RRM measurement mode.

It may be understood that, whether to adjust the RRM measurement mode may be specifically determined based on the preset cell coverage or the preset beam coverage configured by the network device, that is, switching or adjustment between RRM measurement modes is triggered by determining whether a condition based on the preset cell coverage or the preset beam coverage is met, and a ping-pong effect of measurement is avoided. This prevents the terminal device from frequently adjusting the configuration of RRM measurement. The terminal device may receive a reference signal corresponding to a cell or a beam within the preset beam coverage.

It should be noted that a value of each preset time may be set based on an actual situation.

By using the measurement method in this embodiment of this disclosure, the terminal device may perform automatic switching or adjustment at least between the relaxed RRM measurement mode and the normal RRM measurement mode, between the relaxed RRM measurement mode and the enhanced RRM measurement mode, or between the normal RRM measurement mode and the enhanced RRM measurement mode based on the measurement adjustment related parameter configured by the network device.

Figure 2:
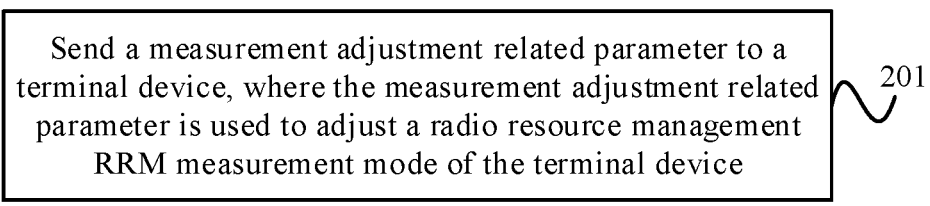
FIG. 2 is a schematic flowchart of a second measurement method according to an embodiment of this disclosure.

FIG. 2 is a schematic flowchart of a measurement method according to an embodiment of this disclosure. The method may be performed by an electronic device, for example, a network device. In other words, the method may be performed by software or hardware installed on the network device. As shown in FIG. 2, the method may include the following step.

Step 201: Send a measurement adjustment related parameter to a terminal device, where the measurement adjustment related parameter is used to adjust a radio resource management RRM measurement mode of the terminal device.

In this embodiment of this disclosure, the measurement adjustment related parameter is configured for the terminal device, so that the terminal device can implement effective switching or adjustment between different RRM measurement modes based on the measurement adjustment related parameter. Therefore, a ping-pong effect of measurement is avoided, while power consumption of the terminal device is reduced. This prevents the terminal device from frequently adjusting the configuration of RRM measurement, and ensures configuration flexibility of the network device.

Optionally, in the measurement method in this embodiment of this disclosure, the foregoing step 201 may be specifically performed as follows:

sending the measurement adjustment related parameter to the terminal device in an RRC connected state by using an RRC dedicated message or a broadcast message; or sending the measurement adjustment related parameter to the terminal device in an RRC idle state or an RRC inactive state by using an RRC connection release message, an RRC connection suspension message, or a broadcast message.

Optionally, in the measurement method in this embodiment of this disclosure, before the foregoing step 201, the method may specifically further include the following content:

receiving a measurement adjustment request sent by the terminal device, where the measurement adjustment request includes a request for obtaining the measurement adjustment related parameter.

It may be understood that, the measurement adjustment related parameter for adjusting the RRM measurement mode is configured for the terminal device based on the measurement adjustment request of the terminal device.

Further optionally, the measurement adjustment request may further include a request for obtaining configuration information of the RRM measurement mode, so that the terminal device performs RRM measurement based on a related specific configuration.

Optionally, in the measurement method in this embodiment of this disclosure, the measurement adjustment related parameter is used to adjust an RRM measurement mode of at least one of a current cell and a neighboring cell of the terminal device.

It may be understood that the measurement adjustment related parameter configured for the terminal device may be used to adjust at least one of the RRM measurement mode of the current cell and the RRM measurement mode of the neighboring cell of the terminal device.

Optionally, in the measurement method in this embodiment of this disclosure, the measurement adjustment related parameter includes one of the following:

(1) a parameter separately configured for the terminal device, that is, a per-UE configuration, that is, the network device may configure a separate measurement adjustment related parameter for each terminal device, so that the parameters better adapt to different types of terminal devices with different performance and configurations;

(2) a parameter configured for the current cell of the terminal device, that is, a per-cell configuration, that is, the network device may configure consistent parameters within a range of the cell, and the terminal device applies related parameters within the range of the current cell;

(3) a parameter configured within a range of each frequency, carrier, band, or bandwidth part, that is, a per-frequency, per-carrier, per-band, or per-BWP configuration, that is, the network device configures consistent parameters within the range of the frequency, the carrier, the band, or the BWP;

(4) a parameter configured within a range of each frequency, carrier, band, or bandwidth part for the terminal device, that is, a per-frequency, per-carrier, per-band, or per-BWP configuration per UE, that is, the network device may configure consistent parameters within the range of the frequency, the carrier, the band, or the BWP for each terminal device; and (5) a parameter configured for each beam corresponding to the terminal device, that is, a per-beam configuration, that is, the terminal device may apply the parameter when performing RRM measurement on a corresponding beam.

Optionally, in the measurement method in this embodiment of this disclosure, the measurement adjustment related parameters configured by the network device may include a plurality of types of parameters. This enables the terminal device to effectively adjust the RRM measurement mode based on different specific measurement adjustment related parameters, and can also ensure configuration flexibility of the network device.

The measurement adjustment related parameter includes at least one of a measurement adjustment threshold, a measurement adjustment duration parameter, preset cell coverage, and preset beam coverage.

Optionally, in the measurement method in this embodiment of this disclosure, the RRM measurement mode includes at least one of a normal RRM measurement mode, a relaxed RRM measurement mode, and an enhanced RRM measurement mode.

The relaxed RRM measurement mode can reduce power consumption of the terminal device. The relaxed RRM measurement mode may include at least a relaxed RRM measurement mode in which the terminal device is in the radio resource control RRC connected state, the RRC idle state, or the RRC inactive state. A related configuration parameter of the relaxed RRM measurement mode may include one of the following:

(1) A measurement period in the relaxed RRM measurement mode is longer than a measurement period in the normal RRM measurement mode.

Optionally, the relaxed RRM measurement mode includes a relaxed RRM measurement mode in time domain. Extension of a measurement period may include extension of an L1 measurement period or an L2 measurement period or an L3 measurement period.

(2) A quantity of samples in a measurement period in the relaxed RRM measurement mode is less than a quantity of samples in a measurement period in the normal RRM measurement mode.

Optionally, the relaxed RRM measurement mode includes a relaxed RRM measurement mode in time domain, and a quantity of samples in a measurement period includes a quantity of L1 samples or L2 samples or L3 samples.

(3) Within a first preset time, a measurement frequency in the relaxed RRM measurement mode is lower than a measurement frequency in the normal RRM measurement mode.

Optionally, the measurement frequency may be 0, that is, RRM measurement is not performed within the first preset time.

(4) A quantity of neighboring cells on which RRM measurement is performed in the relaxed RRM measurement mode is less than a quantity of neighboring cells on which RRM measurement is performed in the normal RRM measurement mode.

Optionally, the neighboring cells may include intra-frequency intra-frequency neighboring cells, inter-frequency inter-frequency neighboring cells, or inter-RAT inter-system neighboring cells.

(5) A quantity of target objects on which inter-frequency RRM measurement or inter-system measurement is performed in the relaxed RRM measurement mode is less than a quantity of target objects on which inter-frequency RRM measurement or inter-system measurement is performed in the normal RRM measurement mode, where the target object includes at least one of a carrier, a frequency, a band, and a bandwidth part.

(6) An additional reference signal is used to perform RRM measurement.

The enhanced RRM measurement mode includes an enhanced RRM measurement mode in which the terminal device is in the radio resource control RRC connected state, the RRC idle state, or the RRC inactive state. A related configuration parameter of the enhanced RRM measurement mode may include one of the following:

(1) A measurement period in the enhanced RRM measurement mode is shorter than a measurement period in the normal RRM measurement mode.

Optionally, the enhanced RRM measurement mode includes a relaxed RRM measurement mode in time domain. Shortening of a measurement period may include shortening of an L1 measurement period or an L2 measurement period or an L3 measurement period.

(2) A quantity of samples in a measurement period in the enhanced RRM measurement mode is greater than a quantity of samples in a measurement period in the normal RRM measurement mode.

Optionally, the enhanced RRM measurement mode includes a relaxed RRM measurement mode in time domain, and a quantity of samples in a measurement period includes a quantity of L1 samples or L2 samples or L3 samples.

(3) Within a second preset time, a measurement frequency in the enhanced RRM measurement mode is higher than a measurement frequency in the normal RRM measurement mode.

(4) A quantity of neighboring cells on which RRM measurement is performed in the enhanced RRM measurement mode is greater than a quantity of neighboring cells on which RRM measurement is performed in the normal RRM measurement mode.

Optionally, the neighboring cells may include intra-frequency intra-frequency neighboring cells, inter-frequency inter-frequency neighboring cells, or inter-RAT inter-system neighboring cells.

(5) A quantity of target objects on which inter-frequency RRM measurement or inter-system measurement is performed in the enhanced RRM measurement mode is greater than a quantity of target objects on which inter-frequency RRM measurement or inter-system measurement is performed in the normal RRM measurement mode, where the target object includes at least one of a carrier, a frequency, a band, and a bandwidth part.

(6) An additional reference signal is used to perform RRM measurement.

For example, when the measurement adjustment related parameter configured for the terminal device includes the measurement adjustment threshold, the terminal device may adjust the RRM measurement mode based on the measurement adjustment threshold and an RRM measurement result, where the measurement adjustment threshold includes at least one of a first threshold and a second threshold.

In other words, the terminal device may determine, based on the measurement adjustment threshold configured by the network device, whether to adjust the RRM measurement mode. In other words, switching or adjustment between RRM measurement modes is triggered by determining whether a condition based on the measurement adjustment threshold is met, and a ping-pong effect of measurement is avoided. This prevents the terminal device from frequently adjusting the configuration of RRM measurement.

Optionally, the measurement adjustment thresholds, that is, the first threshold and the second threshold, may be the same or may be different. At least one of the first threshold and the second threshold may be the same as or different from a threshold of an S-measure (S measure) mechanism for controlling RRM measurement of the neighboring cell currently in the connected state or idle state or inactive state. Further optionally, when the measurement adjustment threshold is used to control adjustment of the RRM measurement mode of the current cell, the first threshold may be higher than or equal to the threshold of the S-measure mechanism, or the first threshold may be lower than or equal to the threshold of the S-measure mechanism threshold. Further optionally, when the measurement adjustment threshold is used to control adjustment of the RRM measurement mode of the neighboring cell, both the first threshold and the second threshold are lower than or equal to the threshold of the S-measure mechanism.

Optionally, in a case in which the first threshold and the second threshold are different, the two thresholds may have different magnitude relationships based on different specific situations. Further optionally, the second threshold is lower than the first threshold.

Further specifically, in a case in which the RRM measurement result is higher than or equal to the first threshold, the terminal device may use the relaxed RRM measurement mode or the normal RRM measurement mode to perform RRM measurement; or in a case in which the RRM measurement result is lower than or equal to the second threshold, the terminal device may use the normal RRM measurement mode or the enhanced RRM measurement mode to perform RRM measurement.

For example, when the measurement adjustment related parameter configured for the terminal device includes the measurement adjustment threshold and a first measurement adjustment duration parameter, the terminal device may adjust the RRM measurement mode based on the measurement adjustment threshold, the RRM measurement result, and the first measurement adjustment duration parameter, where the first measurement adjustment duration parameter includes a third preset time or a fourth preset time.

In other words, the terminal device may determine, based on the measurement adjustment threshold and the first measurement adjustment duration parameter that are configured by the network device, whether to adjust the RRM measurement mode. In other words, switching or adjustment between RRM measurement modes is triggered by determining whether a condition based on the measurement adjustment threshold and the first measurement adjustment duration parameter is met, and a ping-pong effect of measurement is avoided. This prevents the terminal device from frequently adjusting the configuration of RRM measurement.

Specifically, in a case in which the RRM measurement result is higher than or equal to the first threshold within the entire third preset time, the terminal device may use the relaxed RRM measurement mode or the normal RRM measurement mode to perform RRM measurement; or in a case in which the RRM measurement result is lower than or equal to the second threshold within the entire fourth preset time, the terminal device may use the normal RRM measurement mode or the enhanced RRM measurement mode to perform RRM measurement;

or specifically, in a case in which the RRM measurement result is higher than or equal to the first threshold and the RRM measurement result is higher than or equal to the second threshold within the entire third preset time, the terminal device may use the relaxed RRM measurement mode or the normal RRM measurement mode to perform RRM measurement; or in a case in which the RRM measurement result is lower than or equal to the second threshold and the RRM measurement result is lower than or equal to the first threshold within the entire fourth preset time, the terminal device may use the normal RRM measurement mode or the enhanced RRM measurement mode to perform RRM measurement.

For example, when the measurement adjustment related parameter configured for the terminal device includes a second measurement adjustment duration parameter, where the second measurement adjustment duration parameter includes a fifth preset time, after starting to use the relaxed RRM measurement mode or the enhanced RRM measurement mode to perform RRM measurement for the fifth preset time, the terminal device may switch to use the normal RRM measurement mode to perform RRM measurement.

Optionally, the fifth preset time includes at least one of the following:

(1) A set time of an RRM measurement timer.

It may be understood that, when the terminal device uses the relaxed RRM measurement mode or the enhanced RRM measurement mode to start to perform RRM measurement, the RRM measurement timer is started. In a case in which the RRM measurement timer expires, the terminal device automatically switches back to the normal RRM measurement mode.

(2) A time corresponding to a first preset quantity of RRM measurement periods.

It may be understood that, after the terminal device uses the relaxed RRM measurement mode or the enhanced RRM measurement mode to perform RRM measurement for the first preset quantity of RRM measurement periods, the terminal device automatically switches back to the normal RRM measurement mode. Specifically, an RRM measurement period counter may be used to count a total quantity of RRM measurement periods in which RRM measurement is performed by using the relaxed RRM measurement mode or the enhanced RRM measurement mode.

(3) A time required to perform RRM measurement on a second preset quantity of RRM measurement samples.

It may be understood that, after the terminal device uses the relaxed RRM measurement mode or the enhanced RRM measurement mode to perform RRM measurement on the second preset quantity of RRM measurement samples, the terminal device automatically switches back to the normal RRM measurement mode. Specifically, an RRM measurement sample counter may be used to count a total quantity of RRM measurement samples on which RRM measurement is performed by using the relaxed RRM measurement mode or the enhanced RRM measurement mode.

It should be noted that the fifth preset time may alternatively be a time parameter value directly configured by the network device in addition to the foregoing case.

For example, when the measurement adjustment related parameter configured for the terminal device includes preset cell coverage or preset beam coverage, in a case of moving into the preset cell coverage or the preset beam coverage, the terminal device may use the relaxed RRM measurement mode or the enhanced RRM measurement mode to perform RRM measurement, or in a case of moving out of the preset cell coverage or the preset beam coverage, the terminal device may use the normal RRM measurement mode to perform RRM measurement.

It should be noted that a value of each preset time may be set based on an actual situation.

By using the measurement method in this embodiment of this disclosure, the network device configures the measurement adjustment related parameter for the terminal device, so that the terminal device can perform automatic switching or adjustment at least between the relaxed RRM measurement mode and the normal RRM measurement mode, between the relaxed RRM measurement mode and the enhanced RRM measurement mode, or between the normal RRM measurement mode and the enhanced RRM measurement mode based on the measurement adjustment related parameter.

Figure 3:
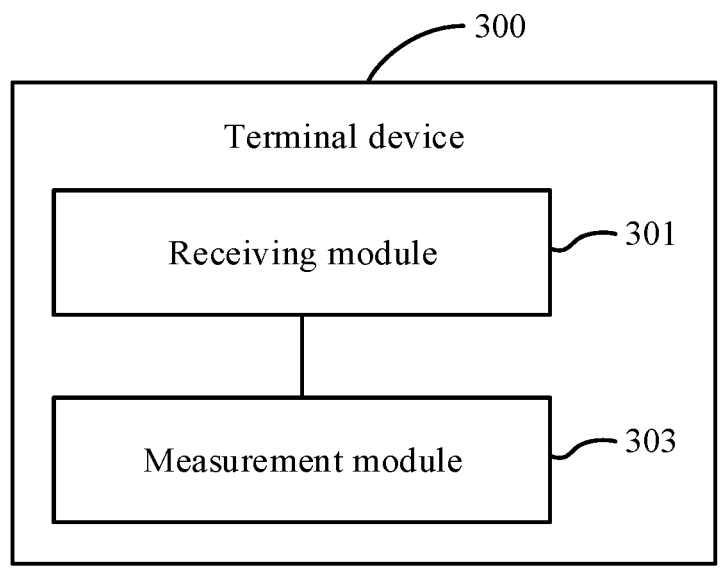
FIG. 3 is a schematic structural diagram of a terminal device according to an embodiment of this disclosure.

FIG. 3 is a schematic structural diagram of a terminal device according to an embodiment of this disclosure. The terminal device 300 includes a receiving module 301 and a measurement module 303.

The receiving module 301 is configured to receive a measurement adjustment related parameter configured by a network device.

The measurement module 303 is configured to adjust a radio resource management RRM measurement mode based on the measurement adjustment related parameter.

Optionally, in the terminal device 300 in this embodiment of this disclosure, the measurement adjustment related parameter includes a measurement adjustment threshold; and the measurement module 303 may be specifically configured to:

adjust the RRM measurement mode based on the measurement adjustment threshold and an RRM measurement result, where the measurement adjustment threshold includes at least one of a first threshold and a second threshold.

Optionally, in the terminal device 300 in this embodiment of this disclosure, the measurement module 303 may be specifically configured to:

if the RRM measurement result is higher than or equal to the first threshold, use a first RRM measurement mode to perform RRM measurement, where the first RRM measurement mode includes a relaxed RRM measurement mode or a normal RRM measurement mode; or if the RRM measurement result is lower than or equal to the second threshold, use a second RRM measurement mode to perform RRM measurement, where the second RRM measurement mode includes a normal RRM measurement mode or an enhanced RRM measurement mode.

Optionally, in the terminal device 300 in this embodiment of this disclosure, the measurement adjustment related parameter further includes a first measurement adjustment duration parameter; and the measurement module 303 may be specifically configured to:

adjust the RRM measurement mode based on the measurement adjustment threshold, the RRM measurement result, and the first measurement adjustment duration parameter, where the first measurement adjustment duration parameter includes a first preset time or a second preset time.

Optionally, in the terminal device 300 in this embodiment of this disclosure, the measurement module 303 may be specifically configured to:

if the RRM measurement result is higher than or equal to the first threshold within the entire first preset time, use a first RRM measurement mode to perform RRM measurement, where the first RRM measurement mode includes a relaxed RRM measurement mode or a normal RRM measurement mode; or if the RRM measurement result is lower than or equal to the second threshold within the entire second preset time, use a second RRM measurement mode to perform RRM measurement, where the second RRM measurement mode includes a normal RRM measurement mode or an enhanced RRM measurement mode.

Optionally, in the terminal device 300 in this embodiment of this disclosure, the measurement module 303 may be specifically configured to:

if the RRM measurement result is higher than or equal to the first threshold, and the RRM measurement result is higher than or equal to the second threshold within the entire first preset time, use a first RRM measurement mode to perform RRM measurement, where the first RRM measurement mode includes a relaxed RRM measurement mode or a normal RRM measurement mode; or if the RRM measurement result is lower than or equal to the second threshold, and the RRM measurement result is lower than or equal to the first threshold within the entire second preset time, use a second RRM measurement mode to perform RRM measurement, where the second RRM measurement mode includes a normal RRM measurement mode or an enhanced RRM measurement mode.

Optionally, in the terminal device 300 in this embodiment of this disclosure, the RRM measurement result includes at least one of the following:

a first result obtained by performing RRM measurement on a current cell of the terminal device, where the first result includes at least one of a cell measurement result and a beam measurement result; and a second result obtained by performing RRM measurement on a neighboring cell of the terminal device, where the second result includes at least one of a cell measurement result and a beam measurement result.

Optionally, in the terminal device 300 in this embodiment of this disclosure, the measurement adjustment related parameter includes a second measurement adjustment duration parameter, and the second measurement adjustment duration parameter includes a third preset time; and the measurement module 303 may be specifically configured to:

after starting to use a third RRM measurement mode to perform RRM measurement for the third preset time, switch to use a fourth RRM measurement mode to perform RRM measurement, where the third RRM measurement mode includes a relaxed RRM measurement mode or an enhanced RRM measurement mode, and the fourth RRM measurement mode includes a normal RRM measurement mode.

Optionally, in the terminal device 300 in this embodiment of this disclosure, the third preset time includes at least one of the following:

a set time of an RRM measurement timer;

a time corresponding to a first preset quantity of RRM measurement periods; and a time required to perform RRM measurement on a second preset quantity of RRM measurement samples.

Optionally, in the terminal device 300 in this embodiment of this disclosure, the measurement adjustment related parameter includes preset cell coverage or preset beam coverage; and the measurement module 303 may be specifically configured to:

if the terminal device moves into the preset cell coverage or the preset beam coverage, use a fifth RRM measurement mode to perform RRM measurement, where the fifth RRM measurement mode includes a relaxed RRM measurement mode or an enhanced RRM measurement mode; or if the terminal device moves out of the preset cell coverage or the preset beam coverage, use a sixth RRM measurement mode to perform RRM measurement, where the sixth RRM measurement mode includes a normal RRM measurement mode.

Optionally, in the terminal device 300 in this embodiment of this disclosure, the relaxed RRM measurement mode includes a relaxed RRM measurement mode in which the terminal device is in a radio resource control RRC connected state, an RRC idle state, or an RRC inactive state.

Optionally, in the terminal device 300 in this embodiment of this disclosure, a measurement period in the relaxed RRM measurement mode is longer than a measurement period in the normal RRM measurement mode; or a quantity of samples in a measurement period in the relaxed RRM measurement mode is less than a quantity of samples in a measurement period in the normal RRM measurement mode; or within a fourth preset time, a measurement frequency in the relaxed RRM measurement mode is lower than a measurement frequency in the normal RRM measurement mode; or a quantity of neighboring cells on which RRM measurement is performed in the relaxed RRM measurement mode is less than a quantity of neighboring cells on which RRM measurement is performed in the normal RRM measurement mode; or a quantity of target objects on which inter-frequency RRM measurement or inter-system measurement is performed in the relaxed RRM measurement mode is less than a quantity of target objects on which inter-frequency RRM measurement or inter-system measurement is performed in the normal RRM measurement mode, where the target object includes at least one of a carrier, a frequency, a band, and a bandwidth part; or an additional reference signal is used to perform RRM measurement.

Optionally, in the terminal device 300 in this embodiment of this disclosure, the enhanced RRM measurement mode includes an enhanced RRM measurement mode in which the terminal device is in a radio resource control RRC connected state, an RRC idle state, or an RRC inactive state.

Optionally, in the terminal device 300 in this embodiment of this disclosure, a measurement period in the enhanced RRM measurement mode is shorter than a measurement period in the normal RRM measurement mode; or a quantity of samples in a measurement period in the enhanced RRM measurement mode is greater than a quantity of samples in a measurement period in the normal RRM measurement mode; or within a fifth preset time, a measurement frequency in the enhanced RRM measurement mode is higher than a measurement frequency in the normal RRM measurement mode; or a quantity of neighboring cells on which RRM measurement is performed in the enhanced RRM measurement mode is greater than a quantity of neighboring cells on which RRM measurement is performed in the normal RRM measurement mode; or a quantity of target objects on which inter-frequency RRM measurement or inter-system measurement is performed in the enhanced RRM measurement mode is greater than a quantity of target objects on which inter-frequency RRM measurement or inter-system measurement is performed in the normal RRM measurement mode, where the target object includes at least one of a carrier, a frequency, a band, and a bandwidth part; or an additional reference signal is used to perform RRM measurement.

Optionally, the terminal device 300 in this embodiment of this disclosure may specifically further include:

a sending module, configured to send a measurement adjustment request to the network device before the measurement adjustment related parameter configured by the network device is received, where the measurement adjustment request includes a request for obtaining the measurement adjustment related parameter.

Optionally, in the terminal device 300 in this embodiment of this disclosure, the receiving module 301 may be specifically configured to:

in a case in which the terminal device is in an RRC connected state, receive the measurement adjustment related parameter by using an RRC dedicated message or a broadcast message; or in a case in which the terminal device is in an RRC idle state or an RRC inactive state, receive the measurement adjustment related parameter by using an RRC connection release message, an RRC connection suspension message, or a broadcast message.

Optionally, in the terminal device 300 in this embodiment of this disclosure, the measurement adjustment related parameter includes one of the following:

a parameter separately configured by the network device for the terminal device;

a parameter configured by the network device for a current cell of the terminal device;

a parameter configured by the network device within a range of each frequency, carrier, band, or bandwidth part;

a parameter configured by the network device within a range of each frequency, carrier, band, or bandwidth part for the terminal device; and a parameter configured by the network device for each beam corresponding to the terminal device.

Optionally, in the terminal device 300 in this embodiment of this disclosure, the measurement module 303 may be specifically configured to:

adjust an RRM measurement mode of at least one of a current cell and a neighboring cell of the terminal device based on the measurement adjustment related parameter.

It can be understood that, the terminal device 300 provided in this embodiment of this disclosure can implement the foregoing measurement method performed by the terminal device 300. Related descriptions about the measurement method are all applicable to the terminal device 300, and are not repeated herein.

In this embodiment of this disclosure, the radio resource management RRM measurement mode is adjusted by using the measurement adjustment related parameter configured by the network device. Therefore, effective switching or adjustment between different RRM measurement modes can be implemented, and a ping-pong effect of measurement is avoided, while power consumption of the terminal device is reduced. This prevents the terminal device from frequently adjusting the configuration of RRM measurement, and ensures configuration flexibility of the network device.

Figure 4:
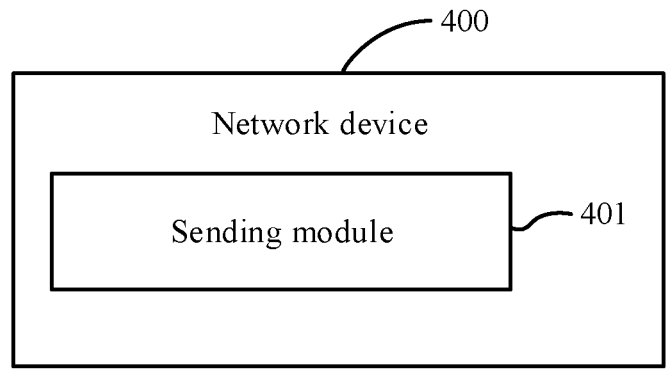
FIG. 4 is a schematic structural diagram of a network device according to an embodiment of this disclosure.

FIG. 4 is a schematic structural diagram of a network device according to an embodiment of this disclosure. The network device 400 includes:

a sending module 401, configured to send a measurement adjustment related parameter to a terminal device, where the measurement adjustment related parameter is used to adjust a radio resource management RRM measurement mode of the terminal device.

Optionally, in the network device 400 in this embodiment of this disclosure, the measurement adjustment related parameter is used to adjust an RRM measurement mode of at least one of a current cell and a neighboring cell of the terminal device.

Optionally, in the network device 400 in this embodiment of this disclosure, the measurement adjustment related parameter includes one of the following:

a parameter separately configured for the terminal device;

a parameter configured for a current cell of the terminal device;

a parameter configured within a range of each frequency, carrier, band, or bandwidth part;

a parameter configured within a range of each frequency, carrier, band, or bandwidth part for the terminal device; and a parameter configured for each beam corresponding to the terminal device.

Optionally, in the network device 400 in this embodiment of this disclosure, the measurement adjustment related parameter includes at least one of a measurement adjustment threshold, a measurement adjustment duration parameter, preset cell coverage, and preset beam coverage.

Optionally, in the network device 400 in this embodiment of this disclosure, the RRM measurement mode includes at least one of a normal RRM measurement mode, a relaxed RRM measurement mode, and an enhanced RRM measurement mode.

Optionally, in the network device 400 in this embodiment of this disclosure, the relaxed RRM measurement mode includes a relaxed RRM measurement mode in which the terminal device is in a radio resource control RRC connected state, an RRC idle state, or an RRC inactive state.

Optionally, in the network device 400 in this embodiment of this disclosure, a measurement period in the relaxed RRM measurement mode is longer than a measurement period in the normal RRM measurement mode; or a quantity of samples in a measurement period in the relaxed RRM measurement mode is less than a quantity of samples in a measurement period in the normal RRM measurement mode; or within a first preset time, a measurement frequency in the relaxed RRM measurement mode is lower than a measurement frequency in the normal RRM measurement mode; or a quantity of neighboring cells on which RRM measurement is performed in the relaxed RRM measurement mode is less than a quantity of neighboring cells on which RRM measurement is performed in the normal RRM measurement mode; or a quantity of target objects on which inter-frequency RRM measurement or inter-system measurement is performed in the relaxed RRM measurement mode is less than a quantity of target objects on which inter-frequency RRM measurement or inter-system measurement is performed in the normal RRM measurement mode, where the target object includes at least one of a carrier, a frequency, a band, and a bandwidth part; or an additional reference signal is used to perform RRM measurement.

Optionally, in the network device 400 in this embodiment of this disclosure, the enhanced RRM measurement mode includes an enhanced RRM measurement mode in which the terminal device is in a radio resource control RRC connected state, an RRC idle state, or an RRC inactive state.

Optionally, in the network device 400 in this embodiment of this disclosure, a measurement period in the enhanced RRM measurement mode is shorter than a measurement period in the normal RRM measurement mode; or a quantity of samples in a measurement period in the enhanced RRM measurement mode is greater than a quantity of samples in a measurement period in the normal RRM measurement mode; or within a second preset time, a measurement frequency in the enhanced RRM measurement mode is higher than a measurement frequency in the normal RRM measurement mode; or a quantity of neighboring cells on which RRM measurement is performed in the enhanced RRM measurement mode is greater than a quantity of neighboring cells on which RRM measurement is performed in the normal RRM measurement mode; or a quantity of target objects on which inter-frequency RRM measurement or inter-system measurement is performed in the enhanced RRM measurement mode is greater than a quantity of target objects on which inter-frequency RRM measurement or inter-system measurement is performed in the normal RRM measurement mode, where the target object includes at least one of a carrier, a frequency, a band, and a bandwidth part; or an additional reference signal is used to perform RRM measurement.

Optionally, in the network device 400 in this embodiment of this disclosure, the sending module 401 may be specifically configured to:

send the measurement adjustment related parameter to the terminal device in the RRC connected state by using an RRC dedicated message or a broadcast message; or send the measurement adjustment related parameter to the terminal device in the RRC idle state or the RRC inactive state by using an RRC connection release message, an RRC connection suspension message, or a broadcast message.

Optionally, the network device 400 in this embodiment of this disclosure may further include:

a receiving module, configured to receive, before the measurement adjustment related parameter is sent to the terminal device, a measurement adjustment request sent by the terminal device, where the measurement adjustment request includes a request for obtaining the measurement adjustment related parameter.

It can be understood that, the network device 400 provided in this embodiment of this disclosure can implement the foregoing measurement method performed by the network device 400. Related descriptions about the measurement method are all applicable to the network device 400, and are not repeated herein.

In this embodiment of this disclosure, the measurement adjustment related parameter is configured for the terminal device, so that the terminal device can implement effective switching or adjustment between different RRM measurement modes based on the measurement adjustment related parameter. Therefore, a ping-pong effect of measurement is avoided, while power consumption of the terminal device is reduced. This prevents the terminal device from frequently adjusting the configuration of RRM measurement, and ensures configuration flexibility of the network device.

Figure 5:
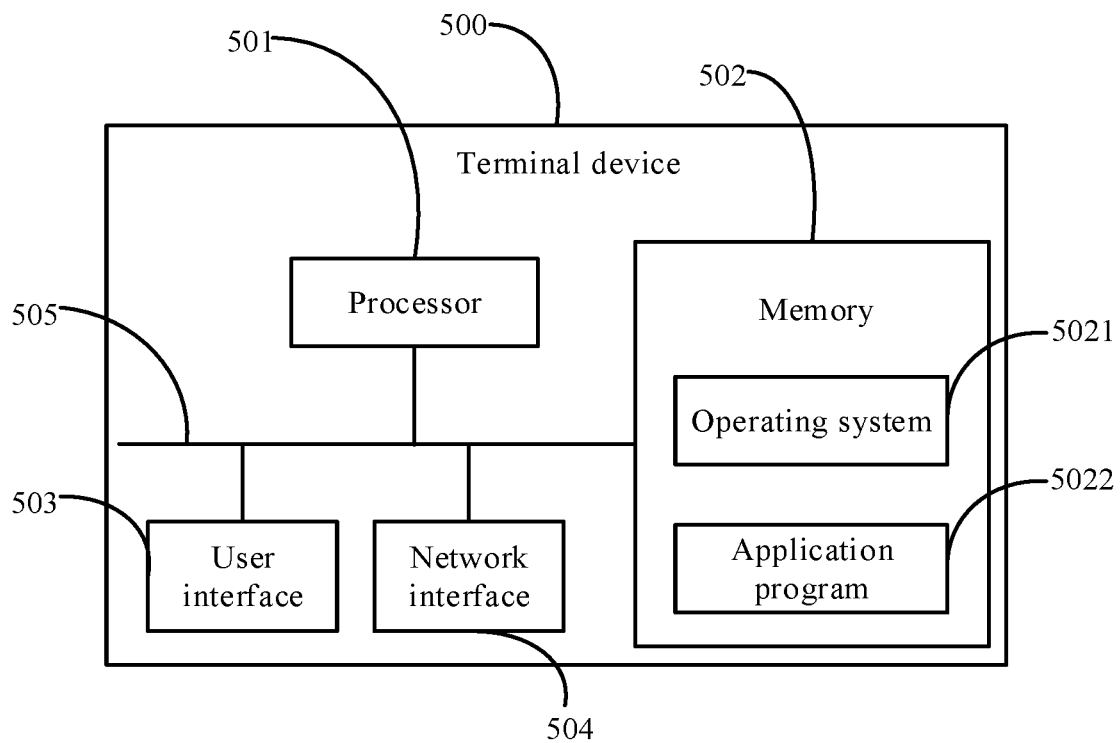
FIG. 5 is a schematic structural diagram of a second terminal device according to an embodiment of this disclosure.

FIG. 5 is a block diagram of a terminal device according to another embodiment of this disclosure. The terminal device 500 shown in FIG. 5 includes at least one processor 501, a memory 502, at least one network interface 504, and a user interface 503. The components in the terminal device 500 are coupled together through a bus system 505. It may be understood that the bus system 505 is configured to implement connection and communication between these components. In addition to a data bus, the bus system 505 further includes a power bus, a control bus, and a status signal bus. However, for clarity of description, various buses are marked as the bus system 505 in FIG. 5.

The user interface 503 may include a display, a keyboard, a pointing device (for example, a mouse or a trackball (trackball)), a touch panel or a touchscreen, or the like.

It may be understood that the memory 502 in this embodiment of this disclosure may be a volatile memory or a non-volatile memory, or may include both a volatile memory and a non-volatile memory. The non-volatile memory may be a read-only memory (Read-Only Memory, ROM), a programmable read only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. As exemplary rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory 502 of the system and the method described in the embodiments of this disclosure is intended to include without being limited to these and any other applicable types of memories.

In some implementations, the memory 502 stores the following elements: executable modules or data structures, or a subset thereof, or an extended set thereof: an operating system 5021 and an application program 5022.

The operating system 5021 includes various system programs, such as a framework layer, a core library layer, and a driver layer, for implementing various basic services and processing hardware-based tasks. The application program 5022 includes various application programs, such as a media player (Media Player), and a browser (Browser), and is configured to implement various application services. A program for implementing the method in the embodiments of this disclosure may be included in the application program 5022.

In this embodiment of this disclosure, the terminal device 500 further includes a computer program stored in the memory 502 and capable of running on the processor 501. When the computer program is executed by the processor 501, the following steps are implemented:

receiving a measurement adjustment related parameter configured by a network device; and adjusting a radio resource management RRM measurement mode based on the measurement adjustment related parameter.

The method disclosed in the foregoing embodiment of this disclosure may be applied to the processor 501 or implemented by the processor 501. The processor 501 may be an integrated circuit chip that has a signal processing capability. In an implementation process, the steps of the foregoing method may be completed by hardware integrated logic circuits in the processor 501 or instructions in the form of software. The processor 501 may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor 501 may implement or execute the methods, steps, and logical block diagrams disclosed in the embodiments of this disclosure. The general-purpose processor may be a microprocessor, or the processor may be any conventional processor or the like. The steps of the methods disclosed with reference to the embodiments of this disclosure may be directly implemented by a hardware decoding processor, or may be implemented by a combination of hardware and software modules in a decoding processor. The software module may be located in a computer-readable storage medium that is mature in the art, such as a random access memory, a flash memory, a read-only memory, a programmable read-only memory or electrically erasable programmable memory, or a register. The computer-readable storage medium is located in the memory 502, and the processor 501 reads information in the memory 502, and completes the steps of the foregoing method in combination with its hardware. Specifically, a computer program is stored in the computer-readable storage medium, and when the computer program is executed by the processor 501, steps of the foregoing measurement method embodiment are implemented.

It may be understood that the embodiments described in the embodiments of this disclosure may be implemented by hardware, software, firmware, middleware, microcode, or a combination thereof. For hardware implementation, the processing unit may be implemented in one or more application specific integrated circuits (Application Specific Integrated Circuit, ASIC), digital signal processors (Digital Signal Processor, DSP), digital signal processing devices (DSP Device, DSPD), programmable logic devices (Programmable Logic Device, PLD), field-programmable gate arrays (Field-Programmable Gate Array, FPGA), general purpose processors, controllers, microcontrollers, microprocessors, and other electronic units for performing the functions described in this disclosure, or a combination thereof.

For software implementation, the technologies described in the embodiments of this disclosure may be implemented by modules (such as processes and functions) that perform the functions described in the embodiments of this disclosure. Software code may be stored in the memory and executed by the processor. The memory may be implemented in or outside the processor.

In this embodiment of this disclosure, the radio resource management RRM measurement mode is adjusted by using the measurement adjustment related parameter configured by the network device. Therefore, effective switching or adjustment between different RRM measurement modes can be implemented, and a ping-pong effect of measurement is avoided, while power consumption of the terminal device is reduced. This prevents the terminal device from frequently adjusting the configuration of RRM measurement, and ensures configuration flexibility of the network device.

The terminal device 500 can implement each process implemented by the terminal device in the foregoing embodiment. To avoid repetition, details are not described herein again.

Figure 6:
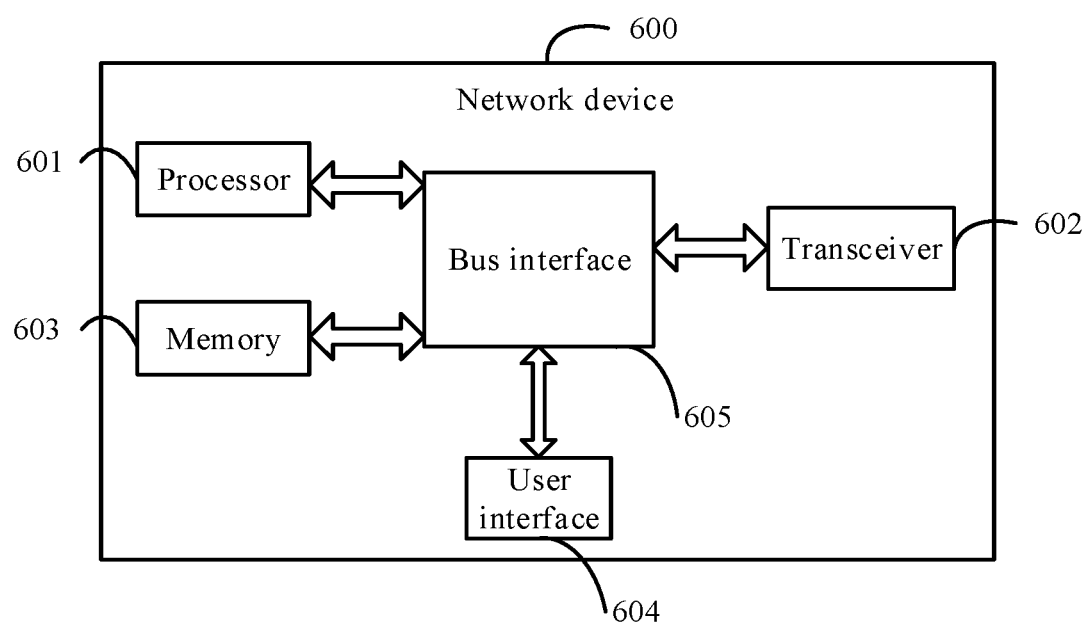
FIG. 6 is a schematic structural diagram of a second network device according to an embodiment of this disclosure.

FIG. 6 is a structural diagram of a network device to which the embodiments of this disclosure are applied. Details of the foregoing measurement method performed by the network device can be implemented, with the same effect achieved. As shown in FIG. 6, the network device 600 includes a processor 601, a transceiver 602, a memory 603, a user interface 604, and a bus interface 605.

In this embodiment of this disclosure, the network device 600 further includes a computer program stored in the memory 603 and capable of running on the processor 601. When the computer program is executed by the processor 601, the following step is implemented:

sending a measurement adjustment related parameter to a terminal device, where the measurement adjustment related parameter is used to adjust a radio resource management RRM measurement mode of the terminal device.

In FIG. 6, a bus architecture may include any quantity of interconnected buses and bridges, and specifically connect together various circuits of one or more processors represented by the processor 601 and of a memory represented by the memory 603. The bus architecture may further interconnect various other circuits such as a peripheral device, a voltage regulator, and a power management circuit. These are all well known in the art, and therefore are not further described in this specification. The bus interface 605 provides an interface. The transceiver 602 may be a plurality of components, including a transmitter and a receiver, and provides units for communicating with a variety of other apparatuses on a transmission medium. For different user equipments, the user interface 604 may also be an interface that can be externally or internally connected to a required device. The connected device includes but is not limited to a keypad, a display, a speaker, a microphone, a joystick, and the like.

The processor 601 is responsible for management of the bus architecture and general processing, and the memory 603 is capable of storing data that is used by the processor 601 during an operation.

In this embodiment of this disclosure, the measurement adjustment related parameter is configured for the terminal device, so that the terminal device can implement effective switching or adjustment between different RRM measurement modes based on the measurement adjustment related parameter. Therefore, a ping-pong effect of measurement is avoided, while power consumption of the terminal device is reduced. This prevents the terminal device from frequently adjusting the configuration of RRM measurement, and ensures configuration flexibility of the network device.

An embodiment of this disclosure further provides a computer-readable storage medium, where a computer program is stored in the computer-readable storage medium. When the computer program is executed by a processor, each process of the foregoing measurement method embodiment is implemented, with the same technical effect achieved. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. Inspired by this disclosure, a person of ordinary skill in the art may develop many other forms without departing from principles of this disclosure and the protection scope of the claims, and all such forms fall within the protection scope of this disclosure.

What is claimed is:

1. A measurement method applied to a terminal device, wherein the method comprises:
   receiving a measurement adjustment related parameter configured by a network device; and
   adjusting a radio resource management RRM measurement mode based on the measurement adjustment related parameter;
   wherein the measurement adjustment related parameter comprises a measurement adjustment threshold; and
   the adjusting a radio resource management RRM measurement mode based on the measurement adjustment related parameter comprises:
   adjusting the RRM measurement mode based on the measurement adjustment threshold and an RRM measurement result, wherein the measurement adjustment threshold comprises at least one of a first threshold and a second threshold;
   wherein the measurement adjustment related parameter further comprises a first measurement adjustment duration parameter; and
   the adjusting the RRM measurement mode based on the measurement adjustment threshold and an RRM measurement result comprises:
   adjusting the RRM measurement mode based on the measurement adjustment threshold, the RRM measurement result, and the first measurement adjustment duration parameter, wherein the first measurement adjustment duration parameter comprises a first preset time or a second preset time;
   wherein the adjusting the RRM measurement mode based on the measurement adjustment threshold, the RRM measurement result, and the first measurement adjustment duration parameter comprises:
   if the RRM measurement result is higher than or equal to the first threshold, and the RRM measurement result is higher than or equal to the second threshold within the entire first preset time, using a first RRM measurement mode to perform RRM measurement, wherein the first RRM measurement mode comprises a relaxed RRM measurement mode or a normal RRM measurement mode; or
   if the RRM measurement result is lower than or equal to the second threshold, and the RRM measurement result is lower than or equal to the first threshold within the entire second preset time, using a second RRM measurement mode to perform RRM measurement, wherein the second RRM measurement mode comprises a normal RRM measurement mode or an enhanced RRM measurement mode.

2. The method according to claim 1, wherein the adjusting the RRM measurement mode based on the measurement adjustment threshold and an RRM measurement result comprises:
   if the RRM measurement result is higher than or equal to the first threshold, using a first RRM measurement mode to perform RRM measurement, wherein the first RRM measurement mode comprises a relaxed RRM measurement mode or a normal RRM measurement mode; or
   if the RRM measurement result is lower than or equal to the second threshold, using a second RRM measurement mode to perform RRM measurement, wherein the second RRM measurement mode comprises a normal RRM measurement mode or an enhanced RRM measurement mode.

3. The method according to claim 1, wherein the adjusting the RRM measurement mode based on the measurement adjustment threshold, the RRM measurement result, and the first measurement adjustment duration parameter comprises:
   if the RRM measurement result is higher than or equal to the first threshold within the entire first preset time, using a first RRM measurement mode to perform RRM measurement, wherein the first RRM measurement mode comprises a relaxed RRM measurement mode or a normal RRM measurement mode; or if the RRM measurement result is lower than or equal to the second threshold within the entire second preset time, using a second RRM measurement mode to perform RRM measurement, wherein the second RRM measurement mode comprises a normal RRM measurement mode or an enhanced RRM measurement mode.

4. The method according to claim 1, wherein the RRM measurement result comprises at least one of the following:
 a first result obtained by performing RRM measurement on a current cell of the terminal device, wherein the first result comprises at least one of a cell measurement result and a beam measurement result; and
 a second result obtained by performing RRM measurement on a neighboring cell of the terminal device, wherein the second result comprises at least one of a cell measurement result and a beam measurement result.

5. The method according to claim 1, wherein the measurement adjustment related parameter comprises a second measurement adjustment duration parameter, and the second measurement adjustment duration parameter comprises a third preset time; and
 the adjusting a radio resource management RRM measurement mode based on the measurement adjustment related parameter comprises:
 after starting to use a third RRM measurement mode to perform RRM measurement for the third preset time, switching to use a fourth RRM measurement mode to perform RRM measurement, wherein the third RRM measurement mode comprises a relaxed RRM measurement mode or an enhanced RRM measurement mode, and the fourth RRM measurement mode comprises a normal RRM measurement mode.

6. The method according to claim 5, wherein the third preset time comprises at least one of the following:
 a set time of an RRM measurement timer;
 a time corresponding to a first preset quantity of RRM measurement periods; and
 a time required to perform RRM measurement on a second preset quantity of RRM measurement samples.

7. The method according to claim 1, wherein the measurement adjustment related parameter comprises preset cell coverage or preset beam coverage; and
 the adjusting a radio resource management RRM measurement mode based on the measurement adjustment related parameter comprises:
 if the terminal device moves into the preset cell coverage or the preset beam coverage, using a fifth RRM measurement mode to perform RRM measurement, wherein the fifth RRM measurement mode comprises a relaxed RRM measurement mode or an enhanced RRM measurement mode; or
 if the terminal device moves out of the preset cell coverage or the preset beam coverage, using a sixth RRM measurement mode to perform RRM measurement, wherein the sixth RRM measurement mode comprises a normal RRM measurement mode.

8. The method according to claim 2, wherein the relaxed RRM measurement mode comprises a relaxed RRM measurement mode in which the terminal device is in a radio resource control RRC connected state, an RRC idle state, or an RRC inactive state.

9. The method according to claim 8, wherein
 a measurement period in the relaxed RRM measurement mode is longer than a measurement period in the normal RRM measurement mode; or
 a quantity of samples in a measurement period in the relaxed RRM measurement mode is less than a quantity of samples in a measurement period in the normal RRM measurement mode; or
 within a fourth preset time, a measurement frequency in the relaxed RRM measurement mode is lower than a measurement frequency in the normal RRM measurement mode; or
 a quantity of neighboring cells on which RRM measurement is performed in the relaxed RRM measurement mode is less than a quantity of neighboring cells on which RRM measurement is performed in the normal RRM measurement mode; or
 a quantity of target objects on which inter-frequency RRM measurement or inter-system measurement is performed in the relaxed RRM measurement mode is less than a quantity of target objects on which inter-frequency RRM measurement or inter-system measurement is performed in the normal RRM measurement mode, wherein the target object comprises at least one of a carrier, a frequency, a band, and a bandwidth part; or
 an additional reference signal is used to perform RRM measurement.

10. The method according to claim 2, wherein the enhanced RRM measurement mode comprises an enhanced RRM measurement mode in which the terminal device is in a radio resource control RRC connected state, an RRC idle state, or an RRC inactive state.

11. The method according to claim 10, wherein
 a measurement period in the enhanced RRM measurement mode is shorter than a measurement period in the normal RRM measurement mode; or
 a quantity of samples in a measurement period in the enhanced RRM measurement mode is greater than a quantity of samples in a measurement period in the normal RRM measurement mode; or
 within a fifth preset time, a measurement frequency in the enhanced RRM measurement mode is higher than a measurement frequency in the normal RRM measurement mode; or
 a quantity of neighboring cells on which RRM measurement is performed in the enhanced RRM measurement mode is greater than a quantity of neighboring cells on which RRM measurement is performed in the normal RRM measurement mode; or
 a quantity of target objects on which inter-frequency RRM measurement or inter-system measurement is performed in the enhanced RRM measurement mode is greater than a quantity of target objects on which inter-frequency RRM measurement or inter-system measurement is performed in the normal RRM measurement mode, wherein the target object comprises at least one of a carrier, a frequency, a band, and a bandwidth part; or
 an additional reference signal is used to perform RRM measurement.

12. The method according to claim 1, wherein before the receiving a measurement adjustment related parameter configured by a network device, the method further comprises:
 sending a measurement adjustment request to the network device, wherein the measurement adjustment request comprises a request for obtaining the measurement adjustment related parameter.

13. The method according to claim 1, wherein the receiving a measurement adjustment related parameter configured by a network device comprises:

in a case in which the terminal device is in an RRC connected state, receiving the measurement adjustment related parameter by using an RRC dedicated message or a broadcast message; or in a case in which the terminal device is in an RRC idle state or an RRC inactive state, receiving the measurement adjustment related parameter by using an RRC connection release message, an RRC connection suspension message, or a broadcast message.

14. The method according to claim 1, wherein the measurement adjustment related parameter comprises one of the following:

a parameter separately configured by the network device for the terminal device;

a parameter configured by the network device for a current cell of the terminal device;

a parameter configured by the network device within a range of each frequency, carrier, band, or bandwidth part;

a parameter configured by the network device within a range of each frequency, carrier, band, or bandwidth part for the terminal device; and a parameter configured by the network device for each beam corresponding to the terminal device.

15. A measurement method applied to a network device, wherein the method comprises:

sending a measurement adjustment related parameter to a terminal device, wherein the measurement adjustment related parameter is used to adjust a radio resource management RRM measurement mode of the terminal device;

wherein the measurement adjustment related parameter comprises a measurement adjustment threshold; and the measurement adjustment threshold comprises at least one of a first threshold and a second threshold;

wherein the measurement adjustment related parameter further comprises a first measurement adjustment duration parameter; and the first measurement adjustment duration parameter comprises a first preset time or a second preset time;

wherein the measurement adjustment related parameter instructs the terminal device to perform the following steps:

if the RRM measurement result is higher than or equal to the first threshold, and the RRM measurement result is higher than or equal to the second threshold within the entire first preset time, using a first RRM measurement mode to perform RRM measurement, wherein the first RRM measurement mode comprises a relaxed RRM measurement mode or a normal RRM measurement mode; or if the RRM measurement result is lower than or equal to the second threshold, and the RRM measurement result is lower than or equal to the first threshold within the entire second preset time, using a second RRM measurement mode to perform RRM measurement, wherein the second RRM measurement mode comprises a normal RRM measurement mode or an enhanced RRM measurement mode.

16. The method according to claim 15, wherein the measurement adjustment related parameter is used to adjust an RRM measurement mode of at least one of a current cell and a neighboring cell of the terminal device.

17. A terminal device, comprising a memory, a processor, and a computer program stored in the memory and capable of running on the processor, wherein when the computer program is executed by the processor, the following steps are implemented:

receiving a measurement adjustment related parameter configured by a network device; and adjusting a radio resource management RRM measurement mode based on the measurement adjustment related parameter;

wherein the measurement adjustment related parameter comprises a measurement adjustment threshold; and the adjusting a radio resource management RRM measurement mode based on the measurement adjustment related parameter comprises:

adjusting the RRM measurement mode based on the measurement adjustment threshold and an RRM measurement result, wherein the measurement adjustment threshold comprises at least one of a first threshold and a second threshold;

wherein the measurement adjustment related parameter further comprises a first measurement adjustment duration parameter; and the adjusting the RRM measurement mode based on the measurement adjustment threshold and an RRM measurement result comprises:

adjusting the RRM measurement mode based on the measurement adjustment threshold, the RRM measurement result, and the first measurement adjustment duration parameter, wherein the first measurement adjustment duration parameter comprises a first preset time or a second preset time;

wherein the adjusting the RRM measurement mode based on the measurement adjustment threshold, the RRM measurement result, and the first measurement adjustment duration parameter comprises:

if the RRM measurement result is higher than or equal to the first threshold, and the RRM measurement result is higher than or equal to the second threshold within the entire first preset time, using a first RRM measurement mode to perform RRM measurement, wherein the first RRM measurement mode comprises a relaxed RRM measurement mode or a normal RRM measurement mode; or if the RRM measurement result is lower than or equal to the second threshold, and the RRM measurement result is lower than or equal to the first threshold within the entire second preset time, using a second RRM measurement mode to perform RRM measurement, wherein the second RRM measurement mode comprises a normal RRM measurement mode or an enhanced RRM measurement mode.

* * * * *